US012741861B2

(12) United States Patent
Ko

(10) Patent No.: US 12,741,861 B2
(45) Date of Patent: Sep. 22, 2026

(54) COUPLER SUPPORTING MODULE FOR DRUM CONTAINER

(71) Applicant: PROTEC CO., LTD., Gyeonggi-do (KR)

(72) Inventor: Youn Sung Ko, Gyeonggi-do (KR)

(73) Assignee: PROTEC CO., LTD., Gyeonggi-do (KR)

( * ) Notice: Subject to any disclaimer, the term of this patent is extended or adjusted under 35 U.S.C. 154(b) by 46 days.

(21) Appl. No.: 18/928,157

(22) Filed: Oct. 27, 2024

(65) Prior Publication Data

US 2025/0136428 A1 May 1, 2025

(30) Foreign Application Priority Data

Oct. 30, 2023 (KR) ........................ 10-2023-0146594

(51) Int. Cl.
*B67D 7/02* (2010.01)
*B65D 1/12* (2006.01)

(52) U.S. Cl.
CPC ................ *B67D 7/02* (2013.01); *B65D 1/12* (2013.01)

(58) Field of Classification Search
None
See application file for complete search history.

(56) References Cited

U.S. PATENT DOCUMENTS 2,722,230 A * 11/1955 Toussaint ............... B67D 7/002 137/342
4,035,004 A * 7/1977 Hengesbach ........... F16L 37/23 222/536
4,376,452 A * 3/1983 Tax .......................... B67D 9/02 254/277
5,199,472 A * 4/1993 Rollison .................. B67D 7/02 222/65
5,558,252 A * 9/1996 Stapensea .............. B67D 7/725 222/181.2
6,045,000 A 4/2000 Rauworth et al.
6,725,890 B1 * 4/2004 Green ....................... B65B 3/28 141/168

(Continued)

FOREIGN PATENT DOCUMENTS

JP H06241871 9/1994
KR 20160021372 2/2016

(Continued)

*Primary Examiner* — Matthew W Jellett
(74) *Attorney, Agent, or Firm* — JCIPRNET

(57) ABSTRACT

Provided is a coupler supporting module configured to support a coupler for a drum container that stores various types of liquid, the coupler being connected to the drum container to enable liquid flow, and more particularly, a coupler supporting module for a drum container, which supports the coupler to tilt according to an angle of a discharge port of the drum container. The coupler supporting module for a drum container allows the coupler to be inserted into the discharge port of the drum container while tilting the coupler to align with an angle the discharge port when the coupler is lowered, by supporting the coupler in a tiltable manner using a tilting joint. Accordingly, the coupler supporting module for a drum container is applicable to an automated device that automatically connects the coupler to the drum container and is effectively utilized.

5 Claims, 7 Drawing Sheets

(56) References Cited

U.S. PATENT DOCUMENTS

| | | | | |
|---|---|---|---|---|
| 6,863,092 | B2 * | 3/2005 | Seiver | B67C 3/30 141/2 |
| 10,807,744 | B1 * | 10/2020 | Seiver | B67B 7/42 |
| 11,565,422 | B2 * | 1/2023 | Ooba | B25J 13/08 |
| 11,975,958 | B2 * | 5/2024 | Tsai | B67D 7/0288 |
| 2022/0380190 | A1 * | 12/2022 | Imai | F16J 13/02 |

FOREIGN PATENT DOCUMENTS

| | | | | |
|---|---|---|---|---|
| KR | 20160021372 A | * | 2/2016 | B67C 3/26 |
| KR | 20170017956 | | 2/2017 | |
| KR | 20200107370 | | 9/2020 | |
| KR | 20220111382 | | 8/2022 | |
| KR | 20230069665 | | 5/2023 | |
| KR | 20230069666 | | 5/2023 | |

* cited by examiner

COUPLER SUPPORTING MODULE FOR DRUM CONTAINER

CROSS-REFERENCE TO RELATED APPLICATION

This application is based on and claims priority under 35 U.S.C. § 119 to Korean Patent Application No. 10-2023-0146594, filed on Oct. 30, 2023, in the Korean Intellectual Property Office, the disclosure of which is incorporated by reference herein in its entirety.

BACKGROUND

Field

The present disclosure relates to a coupler supporting module configured to support a coupler for a drum container that stores various types of liquid, the coupler being connected to the drum container to enable liquid flow, and more particularly, to a coupler supporting module for a drum container, which supports the coupler to tilt according to an angle of a discharge port of the drum container.

Description of Related Art

High-purity and highly corrosive liquids or chemicals are frequently used in industries such as semiconductor processing and chemical product manufacturing. For example, in semiconductor manufacturing, various chemicals are used for each process, such as photoresist (PR), bottom anti-reflective coating (BARC), hexamethyldisilazane (HMDS), thinner, and developer in a photolithography process, slurry in a chemical mechanical planarization (CMP) process, hydrofluoric acid (HF), buffered hydrofluoric acid (BHF), stripper, sulfuric acid, hydrogen peroxide, ammonia, hydrochloric acid (HCl), and phosphoric acid in a wet process, and tetraethyl orthosilicate (TEOS) and copper plating solution in a thin film process.

In particular, in semiconductor manufacturing, as semiconductor devices have become ultra-highly integrated in recent years, the number of manufacturing processes has increased, and after each process, a significant amount of residues or contaminants remains on the surface, and thus the importance of a cleaning process that removes these residues or contaminants is becoming increasingly emphasized. The current semiconductor device manufacturing process consists of approximately 400 steps, of which at least 20% are cleaning and surface treatment processes aimed to prevent wafer contamination Contaminants generated during the semiconductor device manufacturing process have a particularly significant impact on the device's performance, reliability, and yield by distorting the structural shape and electrical characteristics of the device, and therefore must be removed.

In the current semiconductor manufacturing process, the main contaminants generated on a silicon substrate are particles, organic and metallic contaminants, and natural oxide films, all of which significantly affect the yield, quality, and reliability of the product, and methods for removing these contaminants include a wet cleaning method and a dry cleaning method. Among these, the wet cleaning method is the most widely used cleaning method in the current semiconductor device manufacturing process. The wet cleaning method has the advantage of being easily rinsed with deionized (DI) water, leaving very little residue after drying, and offering flexibility in using an appropriate and wide variety of chemical solutions depending on the type of contaminants to be removed.

In a wet cleaning process, various liquids such as hydrofluoric acid are used, and these liquids are generally stored and transported in drum containers with excellent chemical resistance, durability, and impact resistance due to quality and safety concerns These drum containers have been developed and used in various structures, as disclosed in U.S. Pat. No. 6,045,000 (Apr. 4, 2000) and the like.

Great care must be taken when connecting a drum container to a pump or the like in a process line to use a process liquid stored in the drum container. Liquids such as hydrofluoric acid are very harmful to the human body, and any leakage can lead to serious injury or loss of life.

Accordingly, devices for automating the process of connecting a coupler to a drum container have been developed and are in use, but performance remains insufficient. There are often cases where the shape of the drum container varies, and the drum container is placed in different orientations, and thus, there is a need for a coupler supporting module for a drum container, which can accurately insert and fasten the coupler in the correct position and orientation in response to such orientations and angles.

SUMMARY

The present disclosure has been made to address the above-described need, and it is an object of the present disclosure to provide a coupler supporting module for a drum container, which supports a coupler for a drum container to tilt according to an angle of a discharge port of the drum container, enabling automatic attachment and detachment of the coupler to and from the drum container in which liquid is stored.

Additional aspects will be set forth in part in the description which follows and, in part, will be apparent from the description, or may be learned by practice of the presented embodiments of the disclosure.

According to an aspect of the present invention, there is provided a coupler supporting module for a drum container that supports a coupler coupled to a coupler transport unit and configured to discharge a liquid contained inside a drum container, wherein the coupler transport unit transports the coupler supporting module forward, backward, left, and right and raises or lowers the coupler supporting module vertically, the coupler supporting module including a base frame coupled to the coupler transport unit and transported in a vertical direction and a horizontal direction, a slide frame installed to allow horizontal sliding with respect to the base frame, a tilting joint including a tilting support part connected to the slide frame, and a tilting part connected to the tilting support part so as to be supported while allowing a tilting angle to be adjusted in multiple directions with respect to the tilting support part, and a coupler holder coupled to and formed to support the coupler and coupled to the tilting part of the tilting joint, the coupler being inserted into a discharge port of the drum container and discharging the liquid contained inside the drum container.

BRIEF DESCRIPTION OF THE DRAWINGS

The above and other aspects, features, and advantages of certain embodiments of the disclosure will be more apparent from the following description taken in conjunction with the accompanying drawings, in which.

DESCRIPTION OF THE EMBODIMENTS

Figure 1:
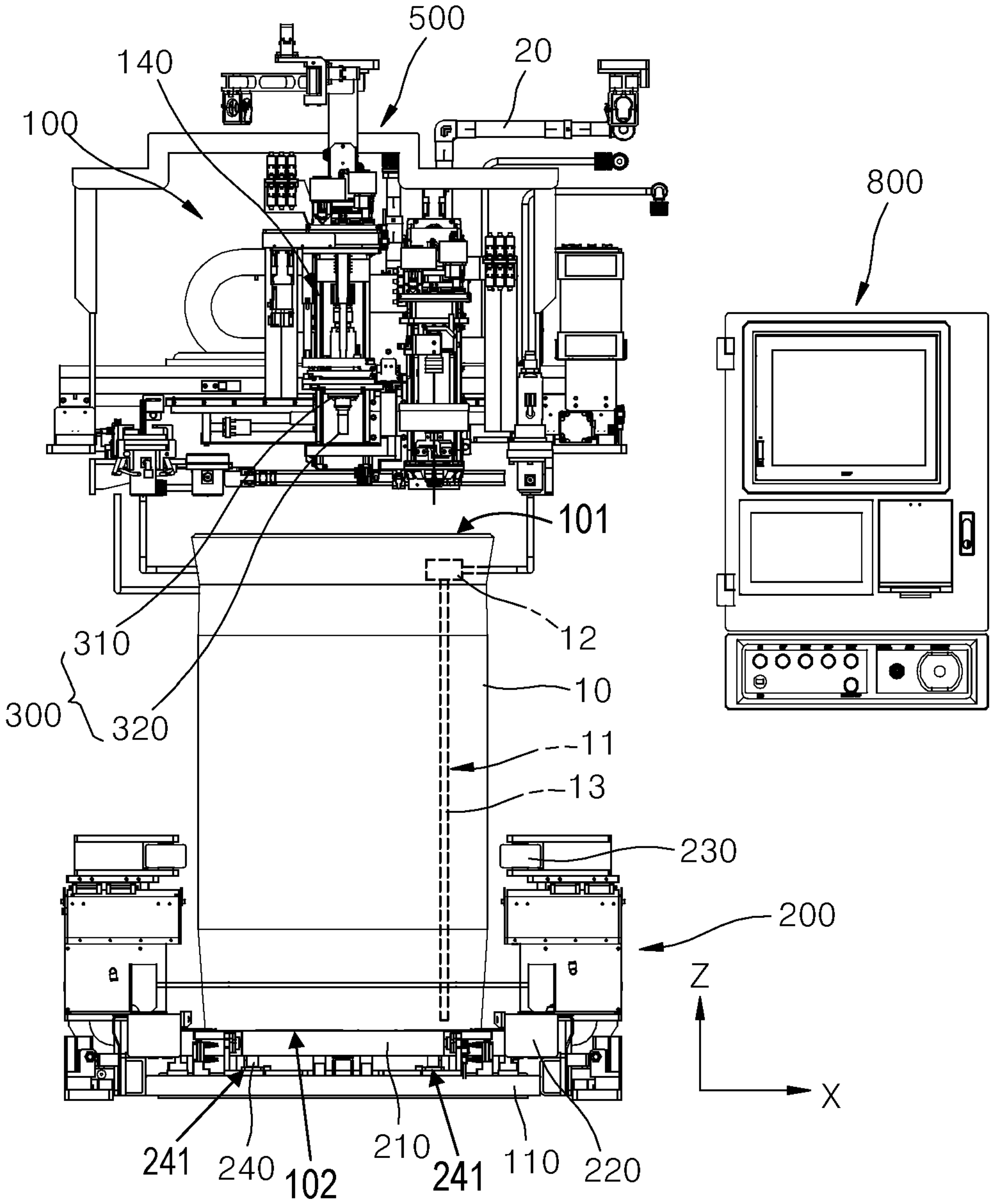
FIG. 1 is a front view of a coupling device using a coupler supporting module for a drum container according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, with reference to the accompanying drawings, a coupler supporting module for a drum container according to the present disclosure will be described in detail.

Figure 2:
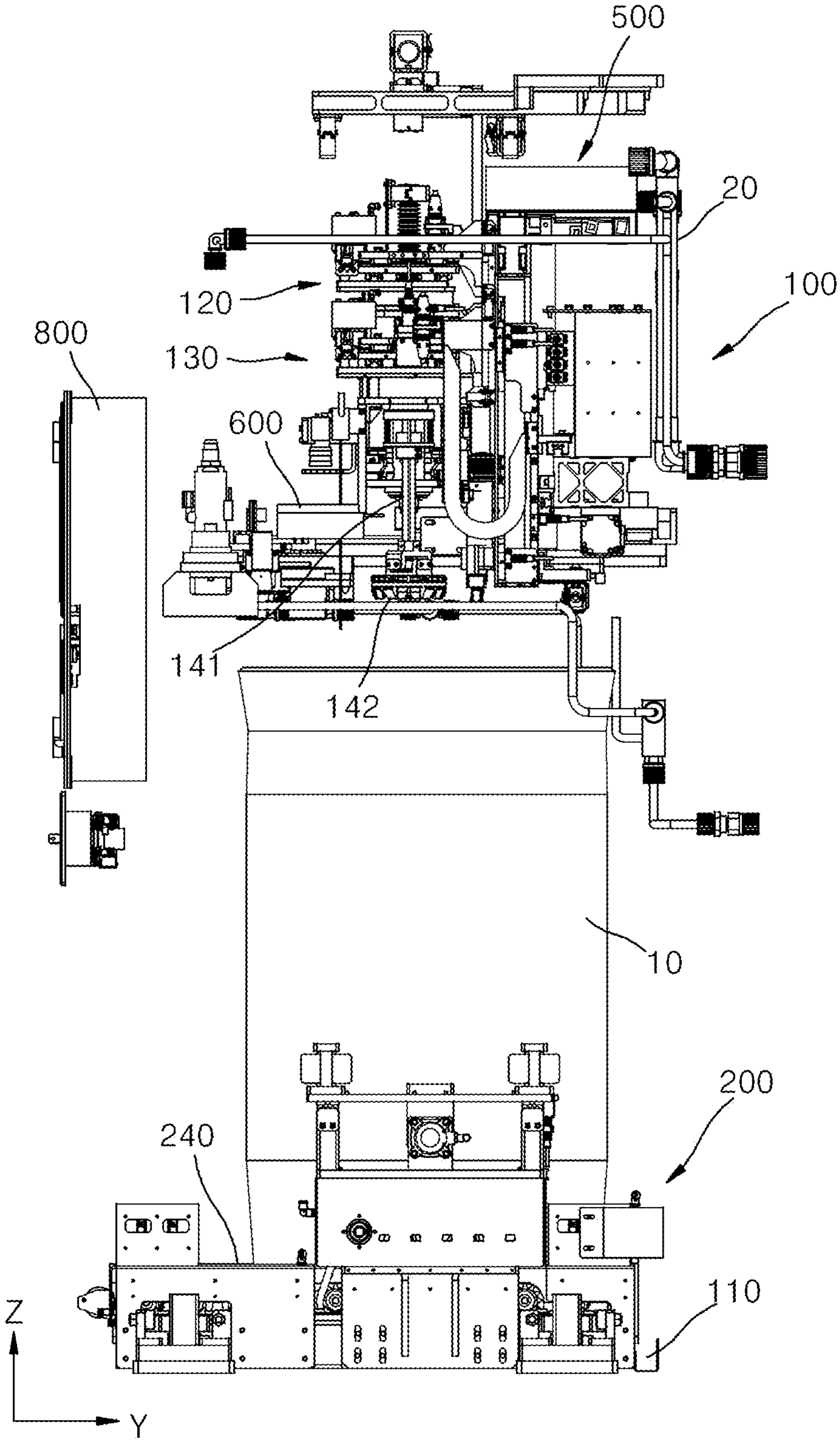
FIG. 2 is a right side view of the coupling device illustrated in FIG. 1.
Figure 3:
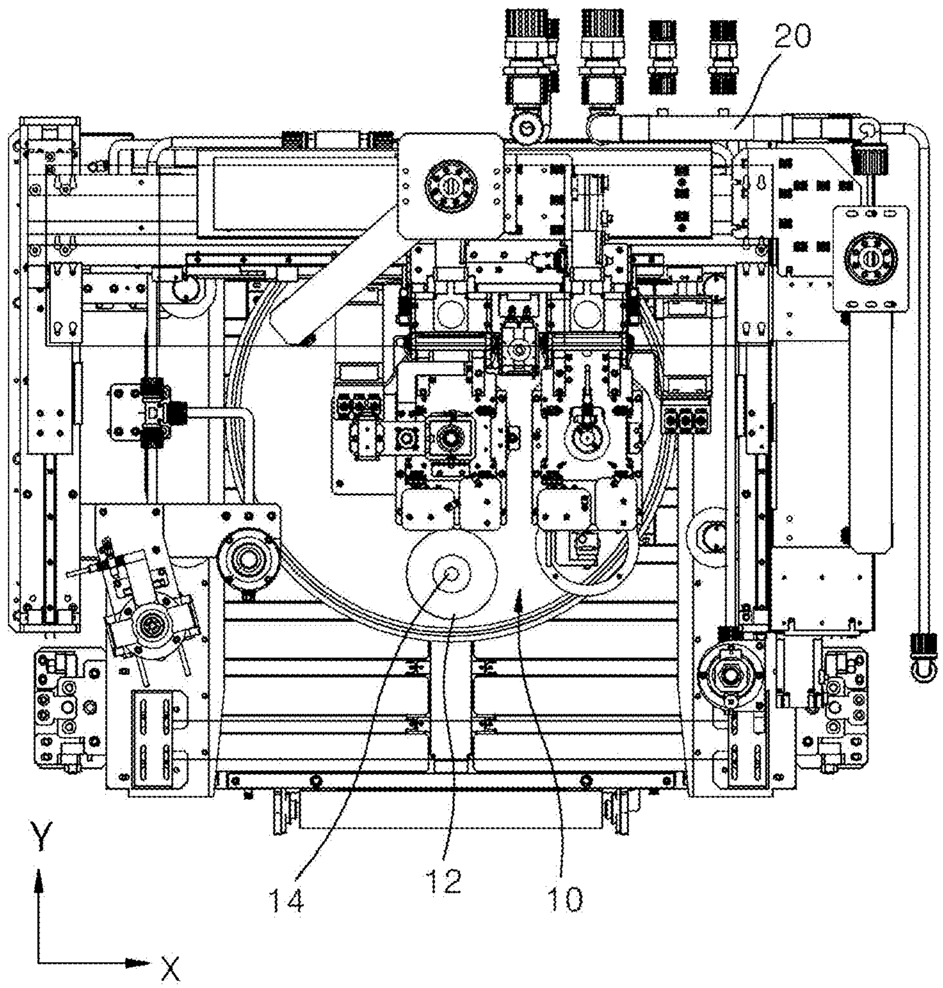
FIG. 3 is a plan view of the coupling device illustrated in FIG. 1.

FIG. 1 is a front view of a coupling device using a coupler supporting module for a drum container according to an embodiment of the present disclosure, FIG. 2 is a right side view of the coupling device illustrated in FIG. 1, and FIG. 3 is a plan view of the coupling device illustrated in FIG. 1.

By automatically connecting or disconnecting a fluid line 20 to or from a drum container 10 that stores fluids such as chemicals, the coupling device using the coupler supporting module for a drum container according to the present embodiment may greatly reduce the work time for connecting or disconnecting the fluid line 20 to or from the drum container 10, and greatly reduce the risk of safety accidents in which workers are exposed to liquid stored in the drum container 10.

The drum container 10 includes an internal tubular body 11 extending into the interior in which liquid is stored. The internal tubular body 11 includes a coupler coupling part 12 that is exposed to the outside from an upper surface 101 of the drum container 10 and an internal tube 13 that extends from the coupler coupling part 12 toward a bottom surface 102 of the drum container 10. A discharge port 14 is provided in the center of the coupler coupling part 12. When a pump (not shown) connected to the fluid line 20 operates after a coupler 300 is connected to the drum container 10, the liquid stored in the drum container 10 is discharged to the outside via the internal tubular body 11, the coupler 300, and the fluid line 20.

A drum container support unit 200 includes a support base 210, a support base rotation mechanism 220, a drum container supporting mechanism 230, and a support base horizontal transport mechanism 240. This drum container support unit 200 rotates the drum container 10 around a vertical rotation axis (a Z-axis) while supporting the drum container, and transports the drum container 10 horizontally in a Y-axis direction.

The support base 210 supports the drum container 10. A weight sensor may be installed on the support base 210. When the drum container 10 is placed on the support base 210, the weight sensor detects the drum container 10 and provides a detection signal to a control unit 800. The control unit 800 may confirm that the drum container 10 has been loaded onto the support base 210 based on the detection signal from the weight sensor, and perform operations that follow the loading of the drum container 10 in sequence.

The support base rotation mechanism 220 is installed between the support base 210 and the support base horizontal transport mechanism 240. The support base rotation mechanism 220 rotates the support base 210 around the vertical rotation axis. An angular displacement of the drum container 10 placed on the support base 210 may be variously adjusted by rotating the support base 210 with the support base rotation mechanism 220. The support base rotation mechanism 220 may utilize various structures that are connected to the support base 210 and can rotate the support base 210 around the vertical rotation axis.

The support base horizontal transport mechanism 240 includes a guide rail 241 disposed on a base 110 in the Y-axis direction.

As shown in FIGS. 1 to 4, the coupler 300 includes a head part 310, which is coupled to the coupler coupling part 12 of the drum container 10, and an insertion tube 320 extending from the head part 310 to be inserted into the discharge port 14 at the center of the coupler coupling part 12.

The coupling structure for maintaining a stable, tight fit between the coupler 300 and the coupler coupling part 12 of the drum container 10 is not limited to that shown in the drawings and may be modified in various ways. A fluid detection sensor (not shown) is coupled to one side of the coupler 300 to detect a flow rate or the like of a fluid passing through the coupler 300. The coupler 300 is tiltably supported by a coupler supporting module 100 of the present disclosure and moved by a coupler transport unit 500. In addition, a pair of insertion grooves 301 for coupling with a coupler holder 410 of the coupler supporting module 100 of the present embodiment are provided on an outer surface 302 of the head part 310 of the coupler 300.

Referring to FIGS. 1 to 3, the coupler supporting module for a drum container according to the present embodiment is installed and used on the base 110 configured to accommodate a drum.

The coupler transport unit 500 is installed on the base 110. The coupler transport unit 500 is configured to transport the coupler supporting module for a drum container according to the present disclosure forward and backward, left and right, and up and down with respect to the base 110. That is, the coupler supporting module for a drum container of the present disclosure is installed in the coupler transport unit 500 and is transported in horizontal and vertical directions by the coupler transport unit 500.

The coupler supporting module for a drum container of the present embodiment includes a base frame 120, a slide frame 130, a tilting joint 140, and the coupler holder 410.

The base frame 120 is coupled to the coupler transport unit 500. Accordingly, the base frame 120 is transported in the horizontal and vertical directions by the coupler transport unit 500. As the base frame 120 is installed in the coupler transport unit 500, the coupler 300 is placed in a state that allows transportation to any location.

The slide frame 130 is installed to allow sliding in the horizontal direction with respect to the base frame 120. The slide frame 130 is a configuration that takes into account a tilted state of the coupler coupling part 12 of the drum container. The slide frame 130 is a configuration for accommodating the horizontal movement of the coupler holder 410 by taking into account the change in a horizontal position of the coupler holder 410 that holds the coupler 300 during the insertion of the coupler 300 into the coupler coupling part 12 of the drum container.

In the present embodiment, the slide frame 130 includes a first slide member 131, a second slide member 132, a first stopper 133, and a second stopper 134.

Figure 4:
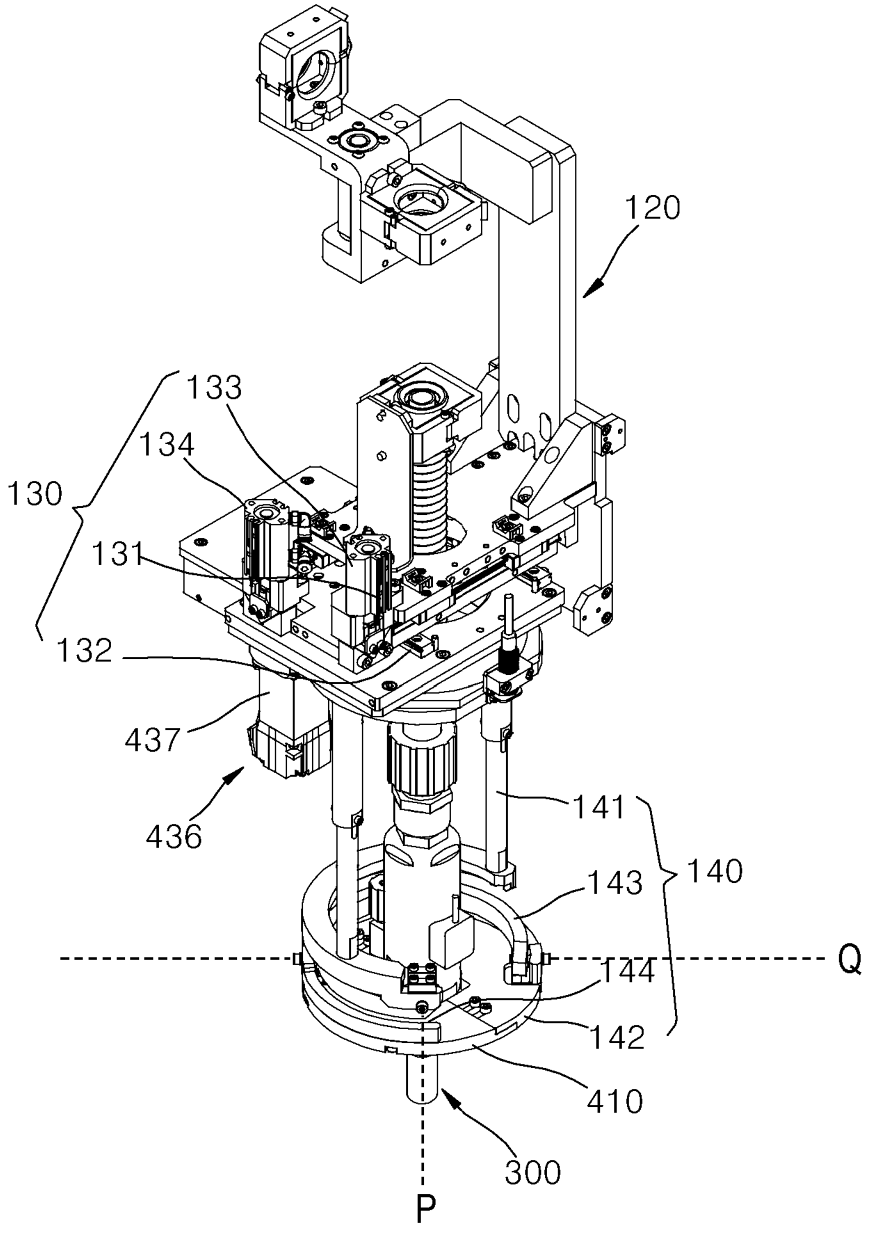
FIG. 4 is a perspective view of a portion of the coupler supporting module for a drum container illustrated in FIG. 1.
Figure 5:
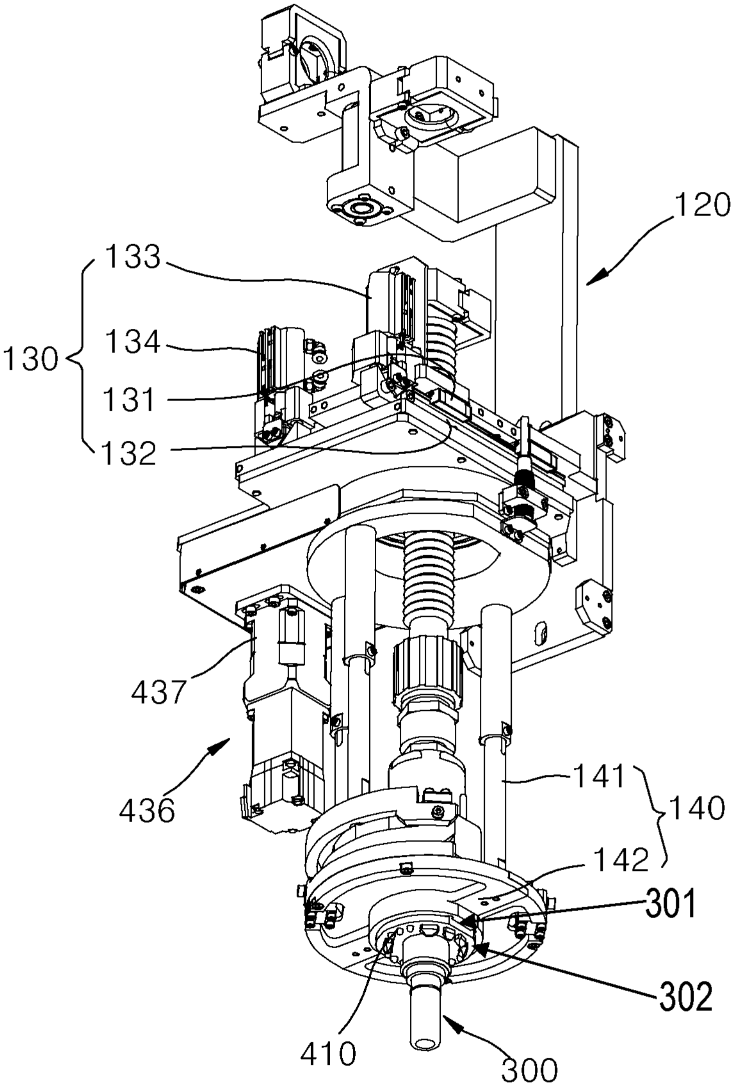
FIG. 5 is a bottom perspective view of the portion of the coupler supporting module for a drum container illustrated in FIG. 1.
Figure 6:
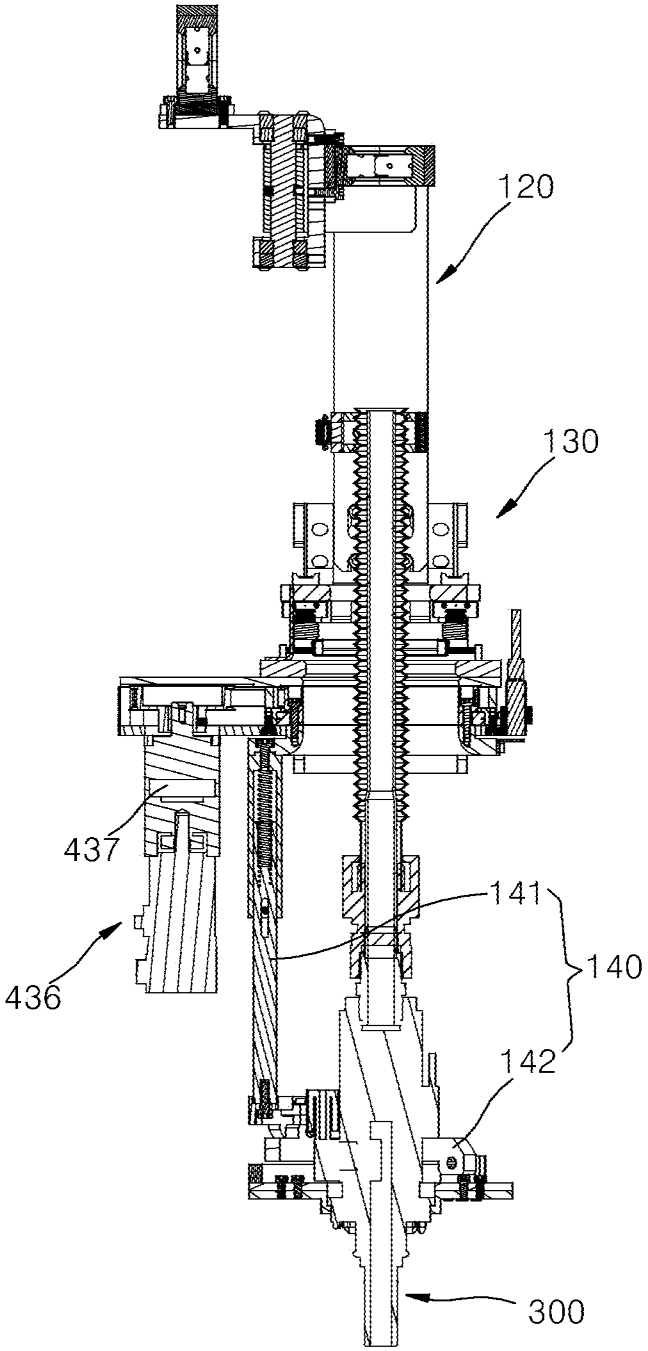
FIG. 6 is a cross-sectional view of the portion of the coupler supporting module for a drum container illustrated in FIG. 1.

The first slide member 131 is coupled to allow sliding in a first direction, which is the horizontal direction. In the present embodiment, the first direction is an X direction based on FIG. 3. The second slide member 132 is coupled to allow sliding in a second direction, which is a horizontal direction and perpendicular to the first direction, with respect to the first slide member 131. In the present embodiment, the second direction is an Y direction based on FIG. 3. The tilting joint 140 is coupled to the second slide member 132 of the slide frame 130. Accordingly, the tilting joint 140 is installed to be freely slidable in the first direction and the second direction with respect to the base frame 120 by the slide frame 130. As described above, in order to slidably install the first slide member 131 and the second slide member 132 in the first direction and the second direction, respectively, a configuration such as guide rails or ball bushes may be used. In the present embodiment, guide rails are used as shown in FIGS. 4 and 5.

The first stopper 133 operates to allow or prevent sliding of the first slide member 131 in the first direction. In the present embodiment, the first stopper is formed in a cylindrical shape. When the first stopper 133 presses the guide rail of the first slide member 131, the first slide member 131 is prevented from sliding in the first direction and is fixed. When the pressure on the guide rail of the first slide member 131 is released by the cylinder-shaped first stopper 133, the first slide member 131 becomes freely slidable in the first direction. Similarly, the second stopper 134 operates to allow or prevent sliding of the second slide member 132 in the second direction. In the present embodiment, the second stopper 134 is also formed in a cylindrical shape. When the second stopper 134 presses the guide rail of the second slide member 132, the second slide member 132 is prevented from sliding in the second direction and is fixed. When the pressure on the guide rail of the second slide member 132 is released by the cylinder-shaped second stopper 134, the second slide member 132 becomes freely slidable in the second direction. By such operations of the first stopper 133 and the second stopper 134, the tilting joint 140 is allowed to slide in the horizontal direction with respect to the base frame 120 or is prevented from sliding and fixed.

As described above, the tilting joint 140 is coupled to the second slide member 132 of the slide frame 130. The tilting joint 140 includes a tilting support part 141 and a tilting part 142. The tilting support part 141 is coupled to the first slide member 131 in a rotatable state around the vertical rotation axis. The tilting part 142 is connected to the tilting support part 141 so as to be supported while allowing a tilting angle θ to be adjusted in multiple directions with respect to the tilting support part 141. The tilting support part 141 and the tilting part 142 are connected to each other. In the present embodiment, the tilting joint 140 further includes a first joint 143 and a second joint. The first joint 143 is installed to allow tilting around a horizontal rotation axis P with respect to the tilting support part 141. The second joint 144 is installed to allow tilting around a rotation axis Q, which is different from the horizontal rotation axis P of the first joint 143, with respect to the first joint 143, and is coupled to the tilting part 142. This structure allows the tilting part 142 to have an angle adjusted to tilt in any direction with respect to the tilting support part 141.

A coupler rotation module 436 is installed on the second slide member 132 of the slide frame 130. The coupler rotation module 436 adjusts a rotation angle of the tilting joint 140 with respect to the second slide member 132. In the present embodiment, the coupler rotation module 436 is configured in the form of a motor 437 (or a driving pulley, a driven pulley, or a belt in another embodiment) and adjusts an angular displacement of the tilting joint 140 as needed. The specific structure of the coupler rotation module 436 may be changed to various other structures aside from a belt-pulley structure.

The coupler holder 410 is coupled to the tilting part 142 of the tilting joint 140. The coupler holder 410 is inserted into the discharge port 14 of the drum container 10 and is coupled to the coupler 300 that discharges the liquid contained inside the drum container 10. The coupler holder 410 is formed to support the coupler 300 and operates to assist in the motion of the coupler 300 being inserted into the discharge port 14 of the drum container 10.

Meanwhile, the tilting joint 140 is configured to align the coupler holder 410 and the coupler 300 vertically under the influence of gravity acting on the coupler holder 410 in a free state with no external forces applied.

Hereinafter, operations of the coupler supporting module for a drum container configured as described above will be described.

As shown in FIGS. 1 to 5, the coupler supporting module for a drum container of the present embodiment operates to ensure that the coupler 300 is smoothly and reliably inserted into the discharge port 14 of the drum container 10 when the coupler 300 is lowered toward the drum container 10, by supporting the coupler 300 to tilt according to an angle of the discharge port 14 of the drum container 10.

First, at a loading operation position, the drum container 10 is loaded onto the support base 210 of the drum container support unit 200. When the drum container 10 is loaded, the weight sensor installed on the support base 210 detects the drum container 10 and provides a detection signal to the control unit 800. When the drum container 10 is placed on the support base 210 and detected by a drum container detection sensor as being out of its fixed place, a detection signal is provided to the control unit 800. In addition, the control unit 800 causes the loading position of the drum container 10 on the support base 210 to be corrected by a method such as generating a warning signal.

When the drum container 10 is stably placed on the support base 210, the drum container supporting mechanism 230 operates to support the drum container 10 and prevent the drum container from tipping over. At this time, when the drum container 10 is out of the center of the support base 210, the drum container 10 is aligned to the center of the support base 210 by the drum container supporting mechanism 230. After the drum container 10 is supported by the drum container supporting mechanism 230, an image-capturing unit 600 captures an image of the upper surface 101 of the drum container 10 and provides the image to the control unit 800. When the image captured by the image-capturing unit 600 is provided to the control unit 800, the control unit 800 calculates coordinates for the position or angle of the coupler coupling part 12 in which the discharge port 14 of the drum container 10 is provided. In addition, the control unit 800 may adjust an angular displacement of the drum container 10 for subsequent work by operating the support base rotation mechanism 220 of the drum container support unit 200 to rotate the drum container 10 around the vertical rotation axis.

After the drum container 10 is image-captured by the image-capturing unit 600, a cap attaching/detaching unit (not shown) operates to separate a cap coupled to the coupler coupling part 12 of the drum container 10 from the drum container 10.

When the cap is separated from the drum container 10, the control unit 800 operates the coupler transport unit 500 to transport the coupler 300 horizontally above the discharge port 14 of the drum container 10. At this time, the control unit 800 operates the first stopper 133 and the second stopper 134 of the slide frame 130 to maintain the first slide member 131 and the second slide member 132 in a state that prevents sliding.

Next, the control unit 800 operates the coupler rotation module 436. The control unit 800 analyzes the shape of the discharge port 14 of the drum container 10 from the image obtained by the image-capturing unit 600 and adjusts an angular displacement of the tilting joint 140 by operating the coupler rotation module 436, so that an angular displacement of the coupler 300 corresponds to the discharge port 14 of the drum container 10. As a result, the angular displacement of the coupler 300 clamped to the coupler holder 410 corresponds to a direction of the discharge port 14. When a portion of the coupler 300 is configured to be rotatable relative to the body of the coupler 300 to prevent twisting of the fluid line 20, only the corresponding portion will rotate such that the angular displacement aligns with the direction of the discharge port 14.

Figure 7:
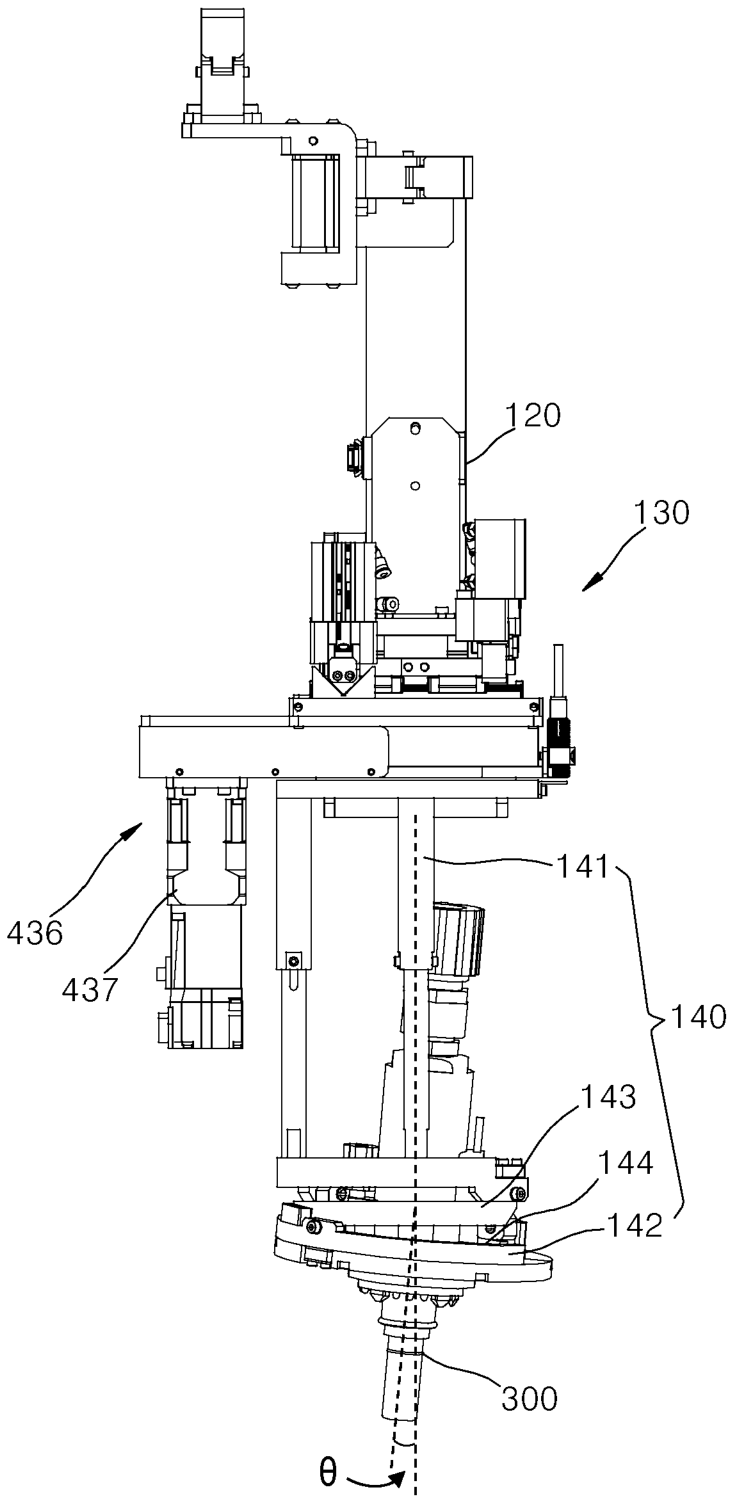
FIG. 7 is a view for describing an operation of the coupler supporting module for a drum container illustrated in FIG. 1.

Next, the control unit 800 operates the coupler transport unit 500 to vertically lower the coupler supporting module for a drum container according to the present embodiment. At this time, the control unit 800 operates the first stopper 133 and the second stopper 134 of the slide frame 130 to maintain the first slide member 131 and the second slide member 132 in a state that allows sliding. When the coupler 300 is lowered toward the coupler coupling part 12 of the drum container 10 together with the tilting joint 140, the insertion tube 320 of the coupler 300 comes into contact with the coupler coupling part 12 and enters the interior of the discharge port 14. At this time, as shown in FIG. 7, a reaction force exerted on the coupler 300 from the drum container 10 causes the tilting part 142 of the tilting joint 140 to tilt with respect to the tilting support part 141. At this time, the slide frame 130 is in a freely slidable state in the horizontal direction through the first slide member 131 and the second slide member 132. Accordingly, even when a horizontal displacement of the coupler holder 410 changes according to an inclination of the discharge port 14 as the coupler 300 is lowered, the first slide member 131 and the second slide member 132 accommodate the change in the horizontal displacement of the coupler holder 410. As a result, stress inside the device, which may be caused by the change in angle of the tilting part 142 as the coupler holder 410 is lowered, is relieved by the operation of the first slide member 131 and the second slide member 132, so that the insertion operation into the discharge port 14 of the coupler 300 may be performed smoothly. In addition, it is possible to prevent damage to the drum container 10 and the coupler supporting module for a drum container. As described above, since the degree of freedom for movement of the coupler holder 410 is increased by the first slide member 131 and the second slide member 132, the changes in angle and position of the tilting part 142 that may occur during the lowering process of the coupler holder 410 can be effectively managed. In particular, when the horizontal position of the coupler holder 410 is adjusted and fixed by the coupler transport unit 500, and the coupler holder 410 is moved only vertically, an angular change of the tilting part 142 is most likely to occur. At this time, as the first slide member 131 and the second slide member 132, which are in a freely sliding state, passively move to adapt to the direction of the force acting on the tilting part 142, the position and orientation of the coupler 300 naturally change to align with the discharge port 14. As a result, it becomes possible to perform the operation of inserting the coupler 300 into the discharge port 14 with a relatively simple and straightforward mechanical configuration without using a sophisticated control device or actuator.

As described above, when the insertion of the coupler 300 into the discharge port 14 is completed, the fluid line 20 connected to the coupler 300 is connected to the drum container 10.

After the coupler 300 is connected to the drum container 10, when the pump connected to the fluid line 20, which is connected to the coupler 300, operates, liquid stored in the drum container 10 is discharged to the outside via the internal tubular body 11, the coupler 300, and the fluid line 20. When all the liquid is discharged from the drum container 10, the control unit 800 operates the coupler transport unit 500 to raise the coupler supporting module 100 to separate the coupler 300 from the drum container 10. Even when the coupler holder 410 is raised by the coupler transport unit 500, the tilting joint 140 and the slide frame 130 interact with each other so that the coupler 300 naturally withdraws from the drum container 10 without exerting any special external force to the discharge port 14 of the drum container 10.

When the coupler 300 is separated from the drum container 10, the tilting part 142 and the coupler 300, which were tilted, are naturally raised vertically upright under their own weight due to gravity. When the coupler 300 is completely separated from the discharge port 14, the control unit 800 operates the first stopper 133 and the second stopper 134 to prevent the first slide member 131 and the second slide member 132 from sliding. This operation prevents the coupler 300 from moving unnecessarily.

After the coupler 300 is separated from the drum container 10, the drum container 10 loaded on the drum container support unit 200 is transported to an unloading operation position and unloaded from the drum container support unit 200. In addition, at the loading operation position, a new drum container 10 is loaded onto the drum container support unit 200, and the same operation process as described above is repeated. Before the drum container 10 is unloaded, the cap may be coupled to the discharge port 14 of the drum container 10 by the cap attaching/detaching unit.

As described above, the coupler supporting module 100 for a drum container according to the present embodiment may insert the coupler 300 into the discharge port 14 while tilting the coupler 300 to align with the angle the discharge port 14 of the drum container 10 when the coupler 300 is lowered, by supporting the coupler 300 in a tiltable manner using the tilting joint 140. Accordingly, the coupler 300 may be stably connected to the drum container 10 without manual work by the worker. Further, the risk of an accidental leakage of liquid from the drum container 10 due to worker error or carelessness may be greatly reduced.

Although the present disclosure has been described above with reference to preferred examples, the scope of the present disclosure is not limited to the embodiments described above.

For example, the slide frame 130 may be modified into various structures. The first stopper 133 and the second stopper 134 of the slide frame 130 may also use various mechanical configurations other than the cylinder-shaped structure.

In addition, various other configurations of the coupler rotation module 436 may be utilized in addition to the belt pulley structure.

In addition, the structure of the tilting joint 140 may also use various other configurations, which may allow for a change in the angle of the tilting part 142 with respect to the tilting support part 141, in addition to the universal joint.

In addition, the structure of the drum container support unit 200 that supports the lower portion of the drum container 10 may also be modified in various ways.

Further, while the previous description provided an example of performing a liquid discharge operation with a single drum container 10 placed in a chamber-shaped housing, it is also possible to apply the coupler supporting module for a drum container of the present disclosure when performing a liquid discharge operation with a plurality of drum containers arranged in the housing at a time. In this case, the liquid discharge operation may be performed by sequentially transporting the coupler to each drum container by the coupler transport unit.

A coupler supporting module for a drum container according to the present disclosure can insert a coupler into a discharge port of a drum container while tilting the coupler to align with an angle the discharge port when the coupler is lowered, by supporting the coupler in a tiltable manner using a tilting joint. Accordingly, the coupler supporting module for a drum container can be applied to an automated device that automatically connects the coupler to the drum container and can be effectively utilized.

Further, a coupler supporting module for a drum container of the present disclosure can align a coupler while accounting for changes in horizontal position during an insertion process, in which the coupler is tilted to align with an angle of a discharge port of a drum container, thereby enabling safer and more efficient operations.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A coupler supporting module for a drum container, the coupler supporting module supporting a coupler that is configured to discharge a liquid contained inside the drum container, and the coupler supporting module comprising:

a base frame moving in a vertical direction and a horizontal direction perpendicular to the vertical direction;

a slide frame coupled to the base frame and comprising a first slide member and a second slide member, wherein the first slide member is movable in a first direction with respect to the base frame, and the second slide member is movable in a second direction with respect to the first slide member, the second direction is perpendicular to the first direction, and the first direction, the second direction, and the horizontal direction are located on a same horizonal plane;

a tilting joint including a tilting support part connected to the second slide member of the slide frame, and a tilting part connected to the tilting support part so as to be supported while allowing a tilting angle to be adjusted in multiple directions with respect to the tilting support part, wherein the slide frame is located above the drum container and directly supports the tilting joint; and a coupler holder coupled to and formed to support the coupler and coupled to the tilting part of the tilting joint, the coupler being inserted into a discharge port of the drum container and discharging the liquid contained inside the drum container, wherein during an insertion of the coupler into the discharge port, the first slide member and the second slide member are freely moved in response to an external force generated by contact between the coupler and the discharge port while the tilting part is freely tilted in response to the external force.

2. The coupler supporting module of claim 1, wherein the slide frame further includes a first stopper stopping the first slide member in the first direction, and a second stopper stopping the second slide member in the second direction.

3. The coupler supporting module of claim 1, wherein the tilting joint is installed on the second slide member of the slide frame, and the coupler supporting module further comprises a coupler rotation module installed on the second slide member, the coupler rotation module rotates the tilting joint around a vertical rotation axis according to a control signal so that the coupler coupled to the coupler holder is placed at an angle corresponding to the discharge port of the drum container.

4. The coupler supporting module of claim 1, wherein the tilting support part and the tilting part of the tilting joint are connected to each other.

5. The coupler supporting module of claim 4, wherein the tilting joint includes a first joint installed to allow tilting around a horizontal rotation axis with respect to the tilting support part, and a second joint installed to allow tilting around a rotation axis different from the horizontal rotation axis of the first joint with respect to the first joint and coupled to the tilting part, wherein the tilting part is coupled to the second joint.

* * * * *